United States Patent
Tran

(10) Patent No.: US 11,609,676 B2
(45) Date of Patent: Mar. 21, 2023

(54) ORTHOGONAL FABRIC USER INTERFACE

(71) Applicant: PEER INC, Bellevue, WA (US)

(72) Inventor: Thinh Tran, Renton, WA (US)

(73) Assignee: PEER INC, Bellevue, WA (US)

( * ) Notice: Subject to any disclaimer, the term of this patent is extended or adjusted under 35 U.S.C. 154(b) by 0 days.

(21) Appl. No.: 17/404,801

(22) Filed: Aug. 17, 2021

(65) Prior Publication Data

US 2022/0057915 A1    Feb. 24, 2022

Related U.S. Application Data

(60) Provisional application No. 63/067,196, filed on Aug. 18, 2020.

(51) Int. Cl.
| | |
|---|---|
| *G06F 3/04815* | (2022.01) |
| *G06F 21/44* | (2013.01) |
| *G06F 16/9537* | (2019.01) |
| *G06F 3/0485* | (2022.01) |
| *G06F 16/954* | (2019.01) |

(52) U.S. Cl.
CPC ........ *G06F 3/04815* (2013.01); *G06F 3/0485* (2013.01); *G06F 16/954* (2019.01); *G06F 16/9537* (2019.01); *G06F 21/44* (2013.01)

(58) Field of Classification Search
None
See application file for complete search history.

(56) References Cited

U.S. PATENT DOCUMENTS

| | | | |
|---|---|---|---|
| 7,003,737 B2 * | 2/2006 | Chiu | G06F 3/0482 345/679 |
| 8,396,452 B1 * | 3/2013 | Matsuoka | H04W 12/08 455/410 |
| 10,747,414 B2 | 8/2020 | Tran | |
| 2006/0190442 A1 | 8/2006 | Limberger | |
| 2008/0007554 A1 | 1/2008 | Kobayashi et al. | |
| 2010/0070888 A1 * | 3/2010 | Watabe | G06F 3/04815 705/5 |
| 2013/0097563 A1 * | 4/2013 | Pacheco Rodrigues Velho .......... G06F 3/0488 715/850 |
| 2013/0227449 A1 | 8/2013 | Brown | |
| 2013/0318445 A1 * | 11/2013 | Mitchell | G06F 3/0488 715/744 |
| 2015/0281323 A1 | 10/2015 | Gold | |
| 2017/0272394 A1 * | 9/2017 | Ding | H04L 51/08 |
| 2018/0096524 A1 * | 4/2018 | Ekambaram | G06F 3/04842 |
| 2020/0342144 A1 * | 10/2020 | Alameh | G06F 3/0481 |
| 2022/0004889 A1 * | 1/2022 | Atkinson, III | G06T 17/00 |

\* cited by examiner

*Primary Examiner* — Christopher J Fibbi
(74) *Attorney, Agent, or Firm* — Seed IP Law Group LLP

(57) ABSTRACT

An orthogonal or multi-dimensional fabric user interface is described herein. A remote server executes an operating system that provides a multi-dimensional fabric for storing content for a particular user. The user can access select content by manipulating the multi-dimensional fabric through a graphical user interface displayed on a display device. In this way, the user experiences and manipulates various data dimensions around the specific content they are accessing, rather than selecting a particular file structure location.

14 Claims, 6 Drawing Sheets

ORTHOGONAL FABRIC USER INTERFACE

TECHNICAL FIELD

The present application pertains to data storage, retrieval, and display, and more particularly, to storing content in a multi-dimensional fabric to enable a user to navigate, locate, access, and directly manipulate specific content by moving the fabric in one or more dimensions.

BACKGROUND

Description of the Related Art

Operating systems have changed little over the past few decades. Early operating systems were character-mode and command driven, where a user specified a particular file location to access data. These operating systems morphed into the visual, icon-based interfaces used today. Icon-based operating systems display graphical representations, or icons, of files or data and are housed in a desktop environment. Icons are associated with a particular file location, such that interaction with an icon by a user results in the corresponding file location being accessed. Accordingly, historical operating systems have been structured around using the file's location within the memory to access data, which limits the flexibility of using alternative storage structures. The desktop environment and icon system calls for precise operation of a visual pointing device, such as a mouse or stylus, which controls the precision of an arrow tip or cursor to select an icon.

BRIEF SUMMARY

Briefly stated, embodiments are directed towards systems and methods that can implement or be implemented as an operating system that provides a multi-dimensional fabric for storing content. Users can access particular content by manipulating the multi-dimensional fabric visually displayed as a graphical user interface. In this way, users experience and manipulate various data dimensions around the specific content that they are accessing. The fabric removes the need for icons and allows for navigation using refined movements, as well as cruder movements like the swipe of an arm, such as for use on larger structures like a table or wall.

The embodiments described in the present disclosure improve upon known data storage architectures, structures, processes, and techniques in a variety of different computerized technologies, such as operating systems, user interfaces, and social networks.

A method may be summarized as including determining when a personal mobile computing device is within range of a display device; selecting a multi-dimensional fabric user interface specific for a user of the personal mobile computing device; displaying, on the display device, the multi-dimensional fabric user interface to the user, wherein content is presented in the multi-dimensional fabric user interface along at least a time axis and a location axis; receiving, via the display device, input from the user; manipulating the multi-dimensional fabric user interface based on the input; and displaying, on the display device, the manipulated multi-dimensional fabric user interface to the user.

A system may be summarized as including a personal mobile computing device that stores authentication information; a display device that includes a first memory that stores first computer instructions and a first processor that when executing the first computer instructions cause the display device to determine when the personal mobile computing device is within range of the display device, coordinate authentication between the personal mobile computing device and a remote server, display a multi-dimensional fabric user interface to a user of the personal mobile computing device based on a valid authentication of the personal mobile computing device, receive input from the user, and provide the input to the remote server; and the remote server includes a second memory that stores second computer instructions and a second processor that when executing the second computer instructions cause the remote server to select the multi-dimensional fabric user interface specific for the user based on the valid authentication of the personal mobile computing device, provide the multi-dimensional fabric user interface to the display device, receive the input from the display device, manipulate the multi-dimensional fabric user interface based on the input, and provide the manipulated multi-dimensional fabric user interface to the display device to be displayed to the user.

The execution of the second computer instructions by the second processor may cause the remote server to store content in a multi-dimensional fabric having a time axis and a location axis. The execution of the second computer instructions by the second processor may cause the remote server to store content in a multi-dimensional fabric having a time axis, a location axis, and a topic axis. The first processor may display a multi-dimensional fabric user interface to a user when further execution of the first computer instructions cause the remote server to display content identifiers arranged in a multi-dimensional fabric that is manipulatable along multiple axes to select content. The multiple axes may include at least two of a time axis, a location, axis, or a topic axis. The first processor may display a multi-dimensional fabric user interface to a user when further execution of the first computer instructions cause the remote server to display a plurality of content arranged based on time, location, and topic in the multi-dimensional fabric user interface. The second processor may manipulate the multi-dimensional fabric user interface when further execution of the second computer instructions cause the remote server to receive a time input from the display device; receive a location input from the display device; and select content to present to the user in the multi-dimensional fabric user interface based on the time input and the location input.

A method may be summarized as including determining when a personal mobile computing device is within range of a display device having a processor; coordinating, by the display device, authentication between the personal mobile computing device and a remote server; selecting a multi-dimensional fabric user interface specific for a user of the personal mobile computing device based on the valid authentication of the personal mobile computing device; displaying, on the display device, the multi-dimensional fabric user interface to the user, wherein content is presented in the multi-dimensional fabric user interface along a time axis and a location axis; receiving, via the display device, input from the user along the time axis or along the location axis, or both; manipulating the multi-dimensional fabric user interface based on the input; and displaying, on the display device, the manipulated multi-dimensional fabric user interface to the user.

The method may further include storing, by the remote server, content in a multi-dimensional fabric having the time axis and the location axis.

The method may further include storing, by the remote server, content in a multi-dimensional fabric having the time axis, the location axis, and a topic axis. The displaying the multi-dimensional fabric user interface to the user may include displaying, by the display device, content identifiers arranged in a multi-dimensional fabric that is manipulatable along multiple axes to select content. The multiple axes may include the time axis, the location axis, and a topic axis. The displaying the multi-dimensional fabric user interface to the user may include displaying, by the display device, a plurality of content arranged based on time, location, and topic in the multi-dimensional fabric user interface. The manipulating the multi-dimensional fabric user interface may include receiving, via the display device, a time input from the user; receiving, via the display device, a location input from the user; and selecting, by the remote server, content to present to the user in the multi-dimensional fabric user interface based on the time input and the location input.

A computing device may be summarized as including a memory that stores content in a multi-dimensional fabric and computer instructions; a processor that executes the computer instructions to perform actions, including receiving, from a display device, an authentication request for a personal mobile computing device; authenticating the personal mobile computing device with the display device; selecting a multi-dimensional fabric user interface specific for the user based on a valid authentication of the personal mobile computing device; providing the multi-dimensional fabric user interface to the display device for presentation to a user of the personal mobile computing device; receiving input from the display device; manipulating the multi-dimensional fabric user interface based on the input; and providing the manipulated multi-dimensional fabric user interface to the display device for presentation to the user.

The memory may store the content in a multi-dimensional fabric having a time axis and a location axis. The memory may store the content in a multi-dimensional fabric having a time axis, a location axis, and a topic axis. The multi-dimensional fabric user interface may include content identifiers arranged in a multi-dimensional fabric that is manipulatable along multiple axes to select content. The multiple axes may include at least two of a time axis, a location, axis, or a topic axis. The processor may execute the computer instructions to perform further actions, including receiving a time input from the display device; receiving a location input from the display device; and selecting content to present to the user in the multi-dimensional fabric user interface based on the time input and the location input.

BRIEF DESCRIPTION OF THE SEVERAL VIEWS OF THE DRAWINGS

Non-limiting and non-exhaustive embodiments are described with reference to the following drawings. In the drawings, like reference numerals refer to like parts throughout the various figures unless otherwise specified.

For a better understanding, reference will be made to the following Detailed Description, which is to be read in association with the accompanying drawings.

DETAILED DESCRIPTION

The following description, along with the accompanying drawings, sets forth certain specific details in order to provide a thorough understanding of various disclosed embodiments. However, one skilled in the relevant art will recognize that the disclosed embodiments may be practiced in various combinations, without one or more of these specific details, or with other methods, components, devices, materials, etc. In other instances, well-known structures or components that are associated with the environment of the present disclosure, including but not limited to the communication systems and networks and the automobile environment, have not been shown or described in order to avoid unnecessarily obscuring descriptions of the embodiments. Additionally, the various embodiments may be methods, systems, media, or devices. Accordingly, the various embodiments may be entirely hardware embodiments, entirely software embodiments, or embodiments combining software and hardware aspects.

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a," "an," and "the" include singular and plural references.

Figure 1:
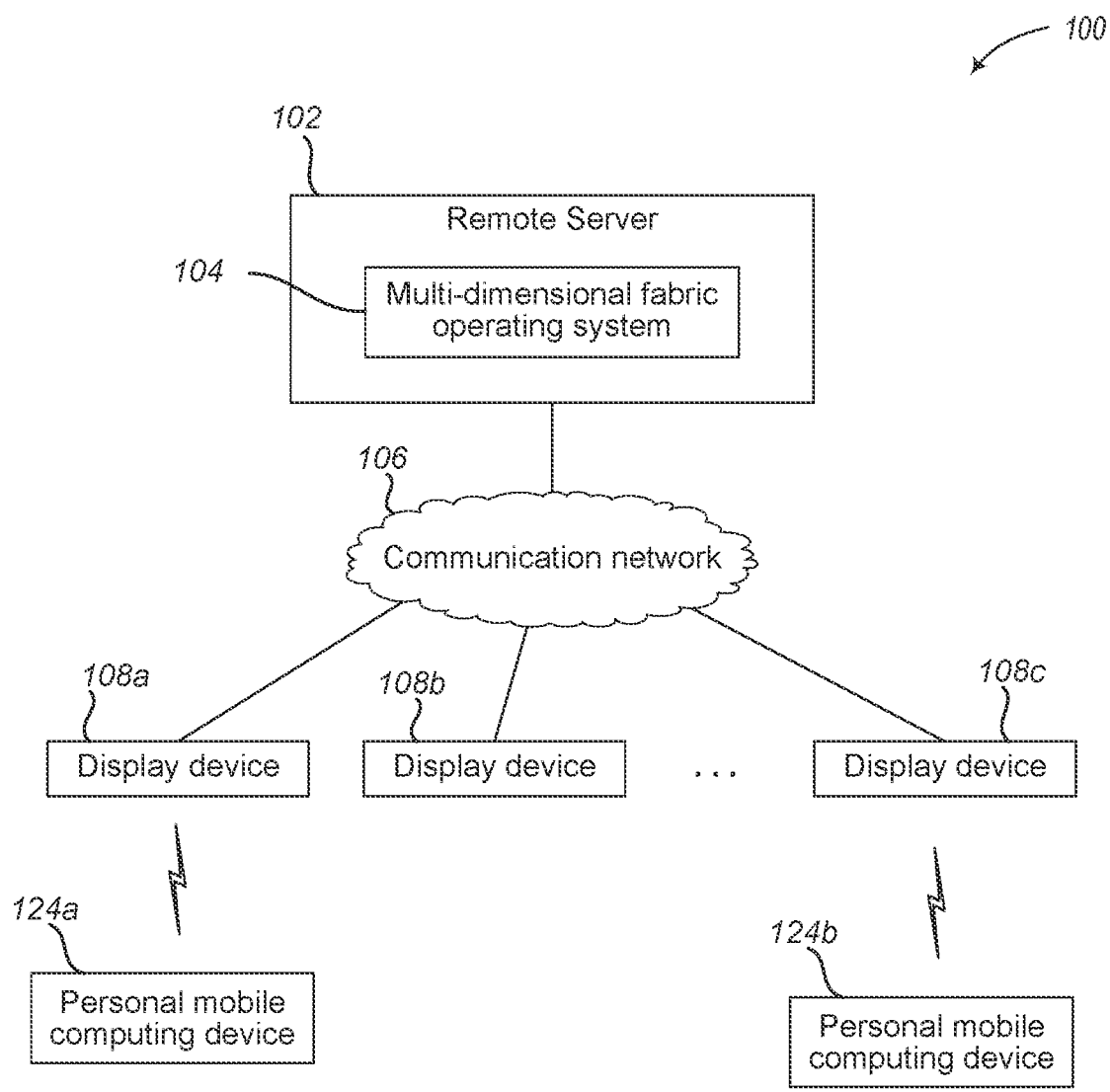
FIG. 1 illustrates a context diagram of an environment that provides a multi-dimensional fabric for storing content in accordance with embodiments described herein.

FIG. 1 illustrates a context diagram of an environment 100 that provides a multi-dimensional fabric for storing content in accordance with embodiments described herein. In the illustrated example, environment 100 includes a remote server 102, one or more display devices 108*a*-108*c*, and one or more personal mobile computing devices.

The remote server 102 is configured as a remote computing system, e.g., cloud computing resources, which implements or executes a multi-dimensional fabric operating system 104. In various embodiments, a separate instance of the multi-dimensional fabric operating system 104 is maintained and executing for each separate personal mobile computing device 124*a*-124*b*. In some embodiments, the multi-dimensional fabric may be implemented as an operating shell.

Although not illustrated, the remote server 102 may also be running various programs that are accessible to the users of the personal mobile computing devices 124a-124b via the multi-dimensional fabric operating system 104. Accordingly, the environment and system described herein make it possible for a plurality of applications to be run in the cloud, and a user accesses a particular application by moving the fabric to that application's coordinates.

The multi-dimensional fabric operating system 104 stores content according to a plurality of different dimensions. In some embodiments, the content is stored based on when the content was captured by the user or when it was stored by the remote server 102 (e.g., a time stamp added to a picture when the picture was captured or a time stamp when the picture was uploaded to the remote server), where the content was captured by the user (e.g., the location of the camera that captured the picture or a location of a display device used to upload the picture from the camera to the remote server), and what the content is about (e.g., food, clothing, entertainment, transportation, etc.). The content may be stored on a single memory or on a plurality of memories. Likewise, the content may be stored by a single computing device or by a plurality of computing devices. In various embodiments, the content is stored as a network of content arranged by two or more dimensions (e.g., time and location) to form a spatial web of content.

Depending on how precise the location is determined (e.g., GPS coordinates compared to zip code), there are a finite number of piece of content for any given time and location. Therefore, each content item existing at each junction of time and location becomes uniquely identifiable and accessible. In some situations, additional dimensions may be used to further define each junction or to uniquely identify content. This allows the generation of a content network that enables users to traverse and navigate this network using time and location (and other optional dimensions).

A user can access the multi-dimensional fabric operating system 104 via a display device 108a. The user has a personal mobile computing device 124, which can create or obtain content. The user can walk up to or approach a display device 108. The display device 108 coordinates authentication of the personal mobile computing device 124 with the remote server 102. The user can then use the display device 108 as a personal computer to upload content from the personal mobile computing device 124 to the remote server 102 using the multi-dimensional fabric operating system 104. Similarly, the user can use the display device 108 to access content previously stored by the multi-dimensional fabric operating system 104. For example, the user can use hand gestures, or touch interfaces, to provide input that manipulates a user interface displayed on the display device 108, where the user interface is generated by the multi-dimensional fabric operating system 104. The remote server 102 can respond to the input by providing an updated user interface of the multi-dimensional fabric to the display device 108 for display to the user.

There are many different applications for utilizing the multi-dimensional fabric described herein. The following examples are for illustrative purposes and are not to be limiting. For example, the multi-dimensional fabric can be used to provide the backbone of a social network. As another example, the multi-dimensional fabric can be used as a backbone for communication of content within Internet-of-Things (IoT) devices. In this example application, each IoT device is located at a particular location and can operate at a particular time, such as when it collects data or performs an action. Accordingly, each IoT device can have a unique ID based on the time and location, which can be used to create communication channels among or with IoT devices. The multi-dimensional fabric, which includes a time factor into the future, can improve communication and control between devices. In some other examples, the multi-dimensional fabric can be used in artificial intelligence mechanisms and models by factoring in time and location, which again can rely on past, present, and future content (e.g., an event scheduled in the future). In yet other examples, the multi-dimensional fabric can be used in search engine functionality by allowing the search engine to identify search results based on a weighing narrative of time, location, and topic. In another example, the multi-dimensional fabric can be used to provide content to ambient hardware devices, such as when the multi-dimensional fabric is run as an operating.

Figure 2:
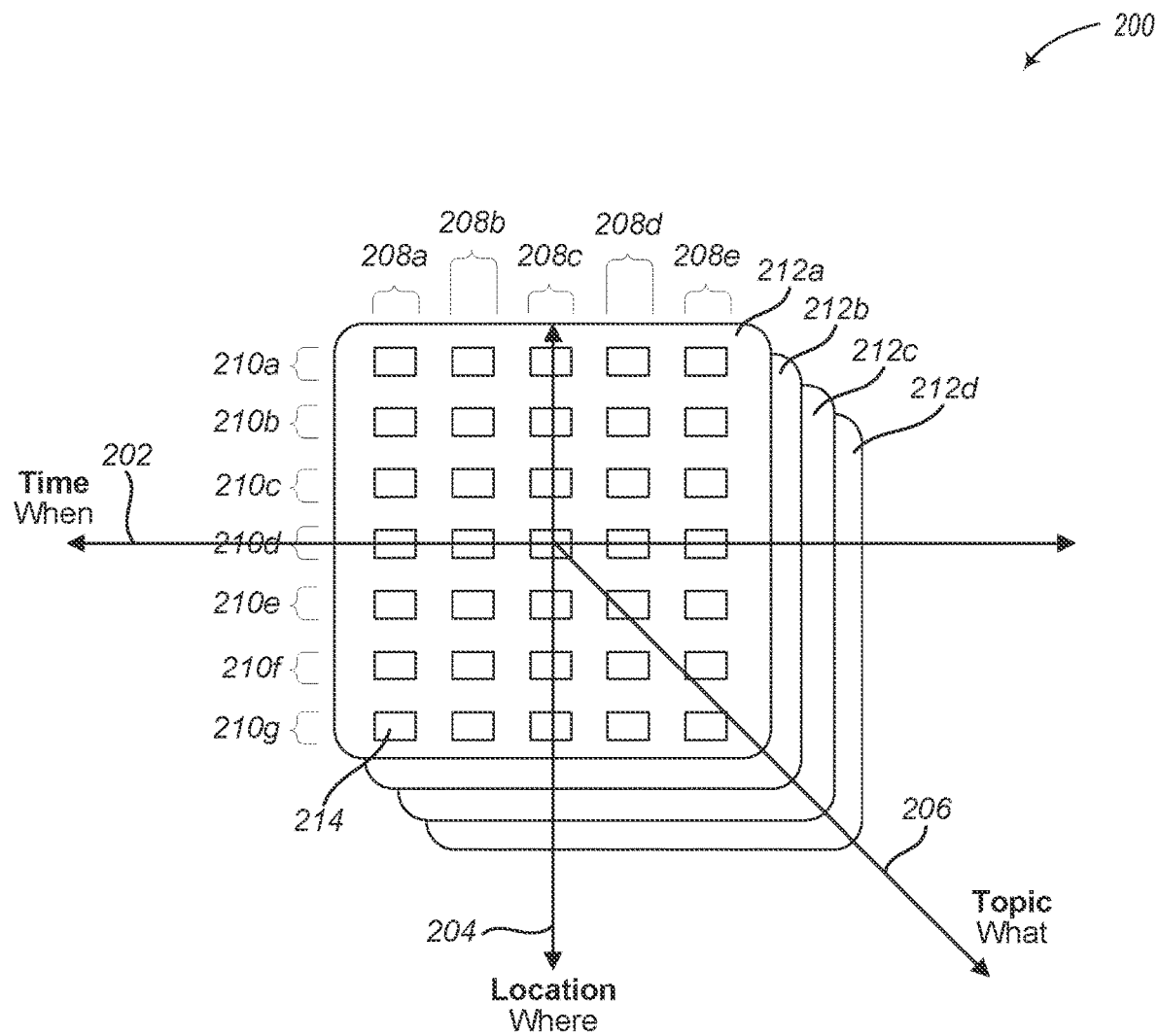
FIGS. 2 and 3 illustrate graphical representations of use case examples of a multi-dimensional fabric for storing content in accordance with embodiments described herein.
Figure 3:
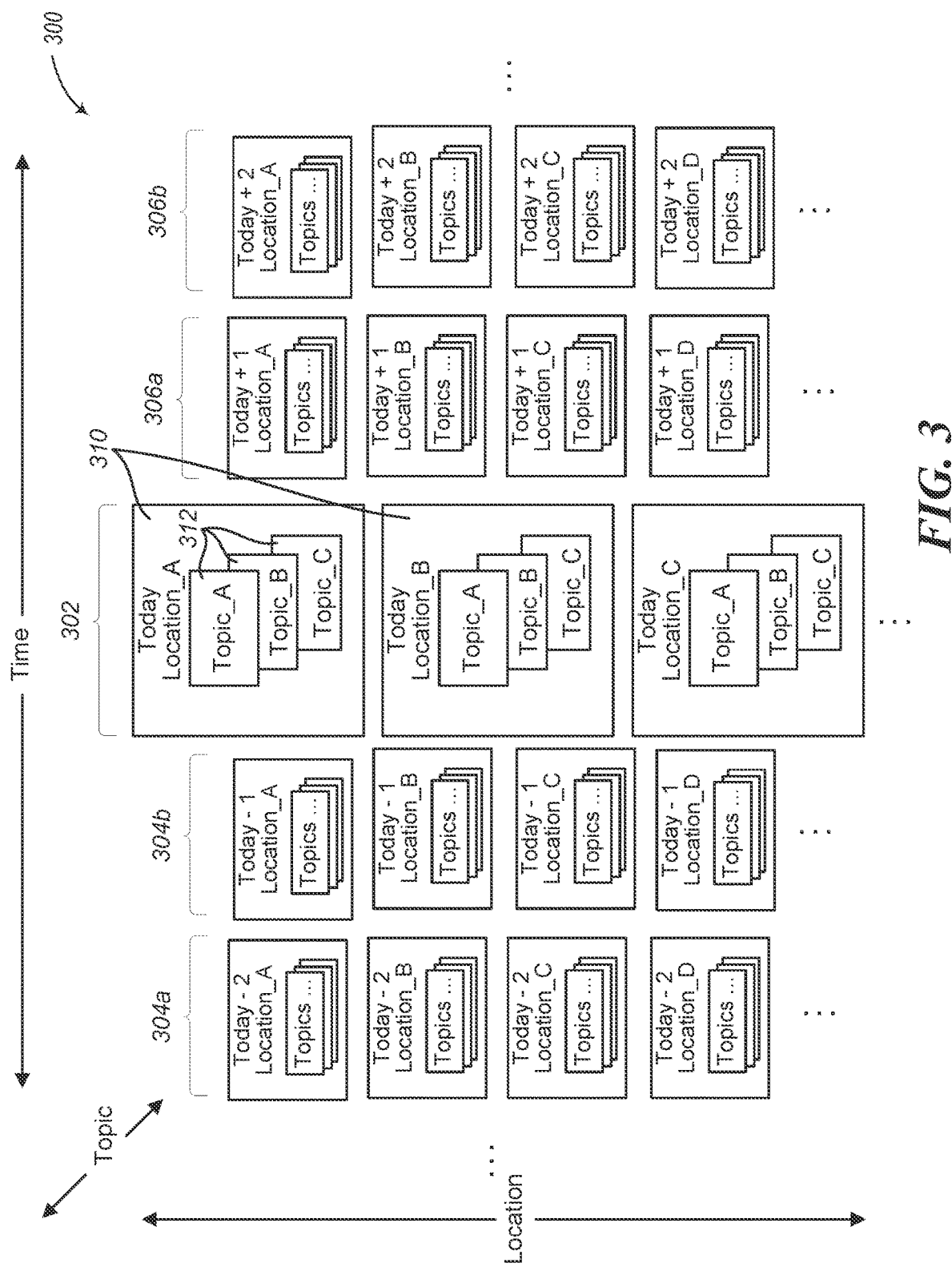

FIGS. 2 and 3 illustrate graphical representations of use case examples of a multi-dimensional fabric for storing content in accordance with embodiments described herein.

Example fabric 200 in FIG. 2 includes a time axis 202, a location axis, and a topic axis 206. Although fabric 200 appears to be constrained in each axis, embodiments are not so limited. Rather, fabric or graphical environment is flexible, while the coordinate is fixed. This allows a user to use cruder movements, like the swipe of an arm, to achieve refined movement to arrive at the content. This also reduces the content footprint because it does not need to manage a file structure, which improves throughput to a degree that it can run entirely in the cloud. In general, the fabric 200 is based on reality, such that content is stored based on real information, which creates a reality-anchored operating system. In various embodiments, reality is comprise of time and location. Furthermore, different aspects of reality can be expressed on digital dimensions of the fabric. Use of different dimensions or aspects of reality can creates a stack of multiple two-axis fabrics.

Users navigate by moving the environment, or fabric, to a specific content or item. The content is placed within a 3-Dimensional structure of Time (when)+Location (where)+Topic (what), which may be in the form of a multi-dimensional coordinate system. By configuring the content in the fabric based on 3 dimensions (What, When, Where), the fabric provides a pre-configured scaffold that allows a user to navigate the plurality of content without the system fetching and organizing it. The fabric makes discovering more relevant content immediately accessible.

The time axis 202 may be arrange as a plurality of different time periods, such as hours or days. In various embodiments, the current time period (e.g., today) is shown in the middle column 208c, which is shown in FIG. 3. The time axis may include past, present, or future times (e.g., when an image was taken in the past, as the image is presently being taken, or when a person intends to take an image in the future).

The location axis 204 may be arranged as a plurality of different locations. In some embodiments, the content locations are selected based on a distance from a current location of the display device that is accessing the fabric 200. For example, locations closest to the display device are arranged in the top column 210a and the locations furthest from the display device are arrange in the bottom column 210g. Likewise, topics may be arranged based on themes or nearest to the display device. For example, food content may be in layer 212a, entertainment content in layer 212b, transportation content in layer 212c, etc. In other embodiments, the topics may be arranged based on frequency of access to the user based on location.

The fabric 200 illustrates a plurality of icons 214 that each represent separate content (also referred to as content 214). The content 214 is laid out in a plurality of time periods 208a-208e (columns), a plurality of locations 210a-210g (rows), and a plurality of topics 212a-212d (layers), using coordinates associated with the separate dimensions. For any given point defined by (What, When, Where) there is a finite amount of content or data. As a result, users can simply point out a certain What, When, and Where to know where something is located and can directly access it from that point.

In some embodiments, the location rows 210, time columns 208, and topic layers may be independent from one another such that a user can manipulate a single axis. In other embodiments, the user can manipulate two or more axes. For example, a user can vertically scroll along the location axis 204 through a single column (e.g., single time period on the time axis), such as column 208c, without affecting the other columns or layers, or the user can vertically scroll along the location axis 204 for multiple columns or multiple layers, or both. Likewise, the user can horizontally scroll along the time axis 202 through a single row (e.g., single location on the location axis), such as row 210d, without affecting the other rows or layers, or the user can horizontally scroll along the time axis 202 for multiple rows or multiple layers, or both. Moreover, the user can depthly scroll along the topic axis 206 through a single layer (e.g., single topic on the topic axis), such as layer 212a, without affecting the other rows or columns, or the user can depthly scroll along the topic axis 206 for multiple rows or multiple columns, or both.

By providing input to one or more axes, the user can manipulate or move the fabric 200 to access content for a specific time, a specific location, and a specific topic. The user can scroll on a particular axis by providing one or more hand gestures. For example, a horizontal movement of the user's arm may move the time axis 202, a vertical movement of the user's arm may move the location axis 204, and an in-or-out movement of the user's arm may move the topic axis 206. The user can then select a specific content 214, such as the content in the middle (along time and location axes) and on top (along the topic axis) of the fabric by moving their arm away from the display screen or by making a fist or by opening their hand.

In some embodiments, the fabric will look two dimensional to a user, but is actually three dimensional, such that when a two-dimensional point is selected by the user, the user can switch axes to view the third dimension. And although FIG. 2 shows the time axis 202 and the location axis 204 on this top-level two-dimensional view, other combinations of axes may also be used, e.g., time v. topic, location v. topic, or other non-illustrated axes.

In various embodiments, the fabric is a computing environment that exists in three dimensional space. In some embodiments, the fabric allows for digital content to anchor to the physical world and for physical content to anchor to the digital world, such as by storing content in the fabric according to time and physical location. The fabric enables a merged experience that eliminates the boundary between physical objects and digital content, which can be a problem in other solutions that use a digital mirror of the physical world.

In various embodiments, the dimensions, or axes, may be set by known parameters that form intuitively navigable intersections or intersecting planes. These intuitively navigable intersections, or dimensions, can be set by a user or an administrator based on user behavior, human visual or physical attributes, or other studies. Examples of such interesting planes may include Time and Space, Horizontal Space and Vertical Space, Network Nodes and Inbound Connections, or others. Similarly, various characteristics of the spatial web may be used as different dimensions. Other dimensions or axes may also be employed. Moreover, dimensions or axes may be perpendicular to one another or at some other orientation or configuration as set by the user or administrator, or as set by the types of dimensions employed. In various embodiments the fabric may be put into a three-dimensional Euclidean space, where the three planes in the space represent solutions of linear equations, and their intersection generates a unique point that represents the set of common solutions. Content is stored on the fabric at this unique point.

Example fabric 300 in FIG. 3 is similar to fabric 200 in FIG. 2. In this example illustration, the current time period 302 is illustrated in a middle column with future time periods 306a-306b to the right of the current time period 302 and past time periods 304a-304b to the left of the current time period. Each location 310 in the current time period 302 includes a plurality of topics 312. These topics 312 are similar to the layers 212 in FIG. 2.

Again, the user can move or manipulate the fabric 300 along one or more axes to select a particular piece of content. Once selected, the particular content is displayed to the user. Various embodiments, of the multi-dimensional fabric described herein can be used for a variety of different content storage technologies. One example technology is the fluid timeline social network described in U.S. patent application Ser. No. 16/300,028, filed Nov. 8, 2018, titled FLUID TIMELINE SOCIAL NETWORK, and issued Aug. 18, 2020, as U.S. Pat. No. 10,747,414, which is incorporated herein by reference.

As shown in FIG. 3, a user can manually manipulate the fabric, such as by using hand gestures, arrows, cursors, or other types of movement capturing technologies, to access specific content. In other embodiments, the user or user's computing device is itself the cursor. For example, a current time and current location of the user or the user's computing device can be used to select specific content within the fabric.

The operation of certain aspects of the disclosure will now be described with respect to FIGS. 4 and 5. In at least one of various embodiments, process 400 described in conjunction with FIG. 4 may be implemented by or executed by a system of one or more computing devices, such as display device 108 in FIG. 1, and process 500 described in conjunction with FIG. 5 may be implemented by or executed by a system of one or more remote computing devices, remote server 102.

Figure 4:
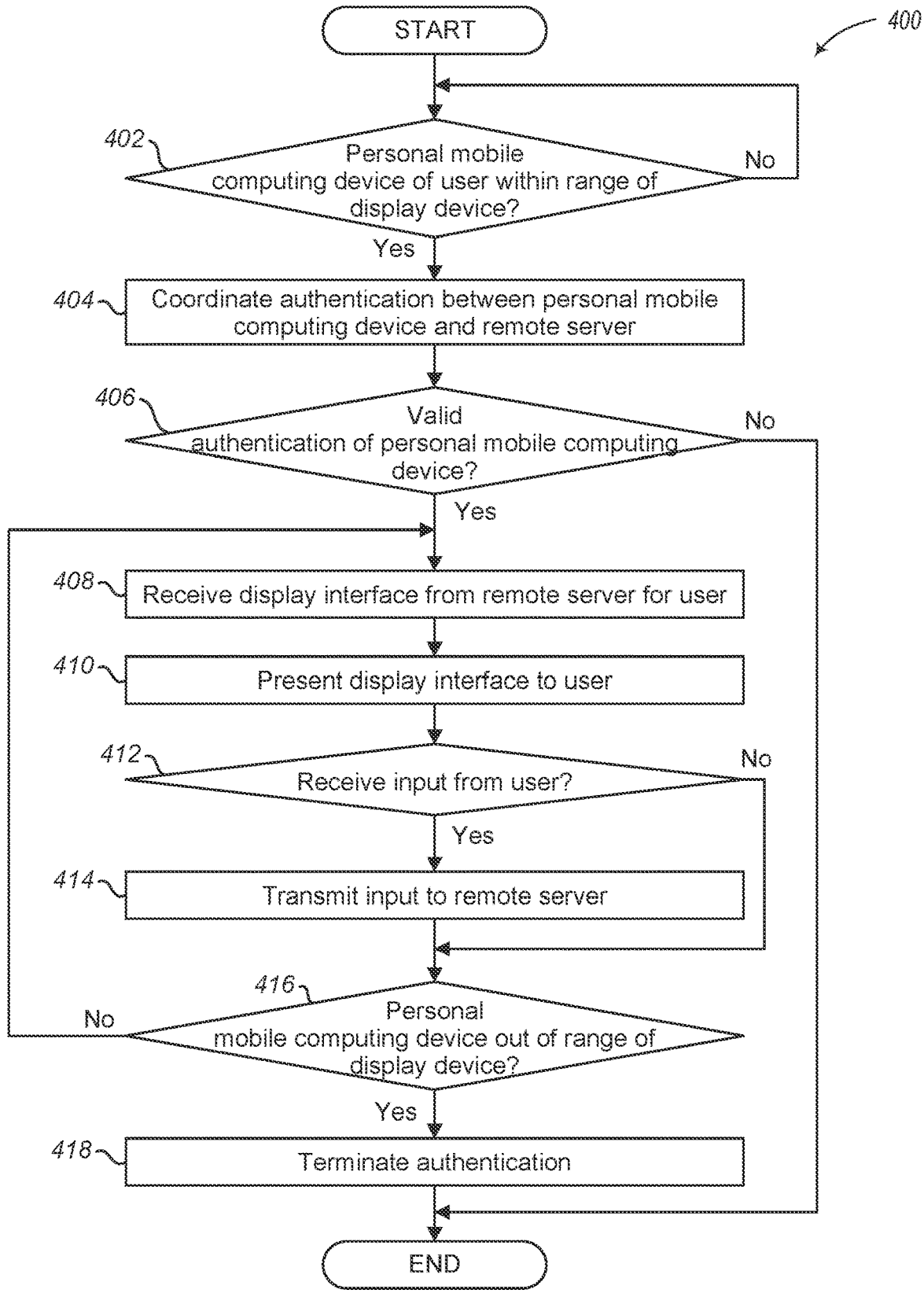
FIG. 4 illustrates a logical flow diagram generally showing one embodiment of a process for accessing a remote server from a display device to present a graphical user interface of a multi-dimensional fabric in accordance with embodiments described herein.

FIG. 4 illustrates a logical flow diagram generally showing one embodiment of a process 400 for accessing a remote server from a display device to present a graphical user interface of a multi-dimensional fabric in accordance with embodiments described herein.

Process 400 begins, after a start block, at decision block 402, where a determination is made whether a personal mobile computing device of a user is within range of the display device. This determination may be made when the personal mobile computing device is within a threshold distance from the display device (e.g., using one or more range detection devices) or when the user indicates or requests to interact with the display device. If the personal mobile computing device is within range of the display device, then process 400 flows to block 404; otherwise process 400 loops to decision block 402 until a personal mobile computing device is within range of the display device.

At block 404, the display device coordinates authentication between the personal mobile computing device and a remote server. This coordination may include obtaining, requesting, or otherwise forwarding authentication keys or other information to determine the validity or authenticity of the personal mobile computing device as being authorized to access the remote server.

Process 400 proceeds to decision block 406, where a determination is made whether the personal mobile computing device is validly authenticated with the remote server. In some embodiments, the remote server may provide a token, session identifier, or other instruction to the display device indicating that the user of the personal mobile computing device is authorized to access the remote server via the display device. If the personal mobile computing device is valid, then process 400 flows to block 408; otherwise, process 400 terminates or otherwise returns to a calling process to perform other actions.

At block 408, the display device receives a display interface from the remote server for the user. In various embodiments, the display interface is customized for the user, such as if the user logged directly onto the remote server to access personal content. As described herein, this display interface is a multi-directional fabric that the user can manipulate, as described herein.

Process 400 continues at block 410, where the display device presents the display interface to the user of the personal mobile computing device. In some embodiments, the display interface is displayed directly by the display device. In other embodiments, the display interface is displayed via the personal mobile computing device.

Process 400 proceeds next to decision block 412, where a determination is made whether the display device has received input from the user. As described herein, the input may be provided via a hand gesture without touching a screen of the display device. Such hand gesture may be a swipe left or right, swipe up or down, or movement towards or away from the screen of the display device. A selection input can then be received if the user rapidly moves their hand away from the screen of the display device or if the user opens or closes his/her hand. If user input is received, then process 400 flows to block 414; otherwise, process 400 flows to decision block 416.

At block 414, the display device transmits the user input to the remote server.

Process 400 proceeds to decision block 416, where a determination is made whether the personal mobile computing device is out of range of the display device (e.g., outside of a threshold distance or the user de-activated the session. If not, process 400 loops to block 408 to receive an updated or modified display interface (based on the user input) and present it to the user. If the personal mobile computing device is out of range of the display device, then process 400 flows to block 418 to terminate the authentication with the remote server.

After block 418, process 400 may terminate or otherwise return to a calling process to perform other actions. In some embodiments, process 400 may loop to decision block 402 to wait for another personal mobile computing device to be within range of the display device.

Figure 5:
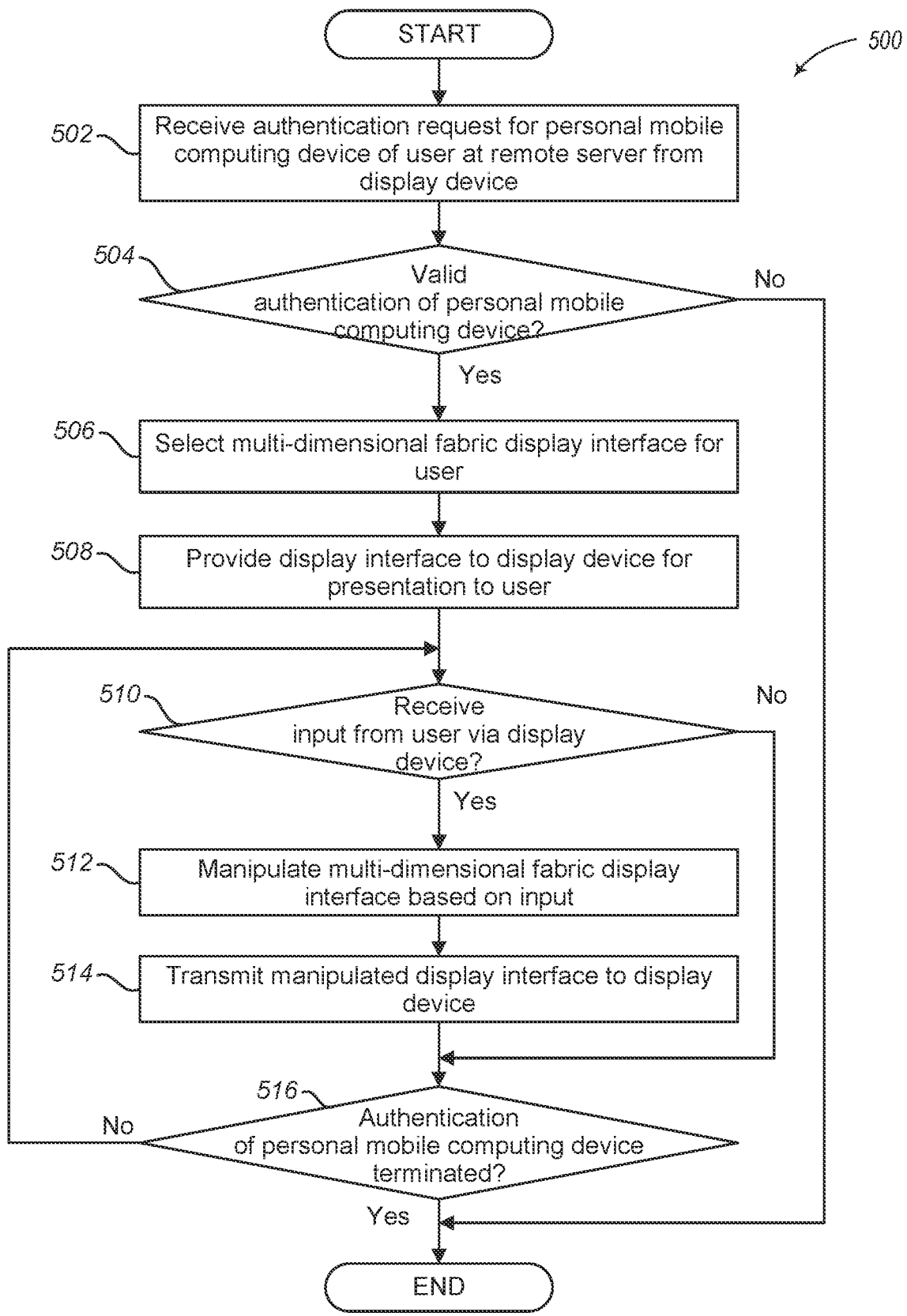
FIG. 5 illustrates a logical flow diagram generally showing one embodiment of a process for a remote server to provide a graphical user interface of a multi-dimensional fabric to a display device in accordance with embodiments described herein.

FIG. 5 illustrates a logical flow diagram generally showing one embodiment of a process 500 for a remote server to provide a graphical user interface of a multi-dimensional fabric to a display device in accordance with embodiments described herein.

Process 500 begins, after a start block, at block 502, where an authentication request is received at a remote server from a display device for a personal mobile computing device of a user. In some embodiments, the authentication request may include encryption keys, user credentials, or other authentication information.

Process 500 proceeds to decision block 504, where a determination is made whether the personal mobile computing device is validly authenticated or not. If the personal mobile computing device is valid, process 500 flows to block 506; otherwise, process 500 terminates or otherwise returns to a calling process to perform other actions.

At block 506, the remote server selects a multi-dimensional fabric display interface for the user of the personal mobile computing device. In some embodiments, the remote server instantiates or accesses a previously running version of the multi-dimensional fabric operating system for the user. In various embodiments, each separate user (or a group of multiple users) has a corresponding multi-dimensional fabric accessible via the remote server. The multi-dimensional fabric display interface with content laid out in a fabric-like structure based on at least time, location, and topic such that the user can manipulate or move the fabric in one or more dimensions to select content.

Process 500 proceeds to block 508, where the remote server provides the selected display interface to the display device for presentation to the user.

Process 500 continues at decision block 510, where a determination is made whether user input has been received from the display device. In various embodiments, the input may be a change or selection of one or more dimensions of the fabric or a user selection. If user input has been received, process 500 flows to block 512; otherwise, process 500 flows to decision block 516.

At block 512, the remote server manipulates the multi-dimensional fabric display interface based on the user input. In some embodiments, the manipulated display interface may include displaying specific content selected by the user. In other embodiments, the manipulated display interface may show a different section or area of the multi-dimensional fabric based on the user input.

Process 500 proceeds next to block 514, where the remote server transmits the manipulated display interface to the display device.

Process 500 continues next at decision block 516, where a determination is made whether the authentication of the personal mobile computing device has terminated. In some embodiments, the display device transmits a termination request to the remote server when the user of the personal mobile computing device walks away from or is out of range of the display device. If the authentication is terminated, process 500 terminates or otherwise returns to a calling process to perform other action; otherwise, process 500 loops to decision block 510 to receive additional user input from the display device.

Figure 6:
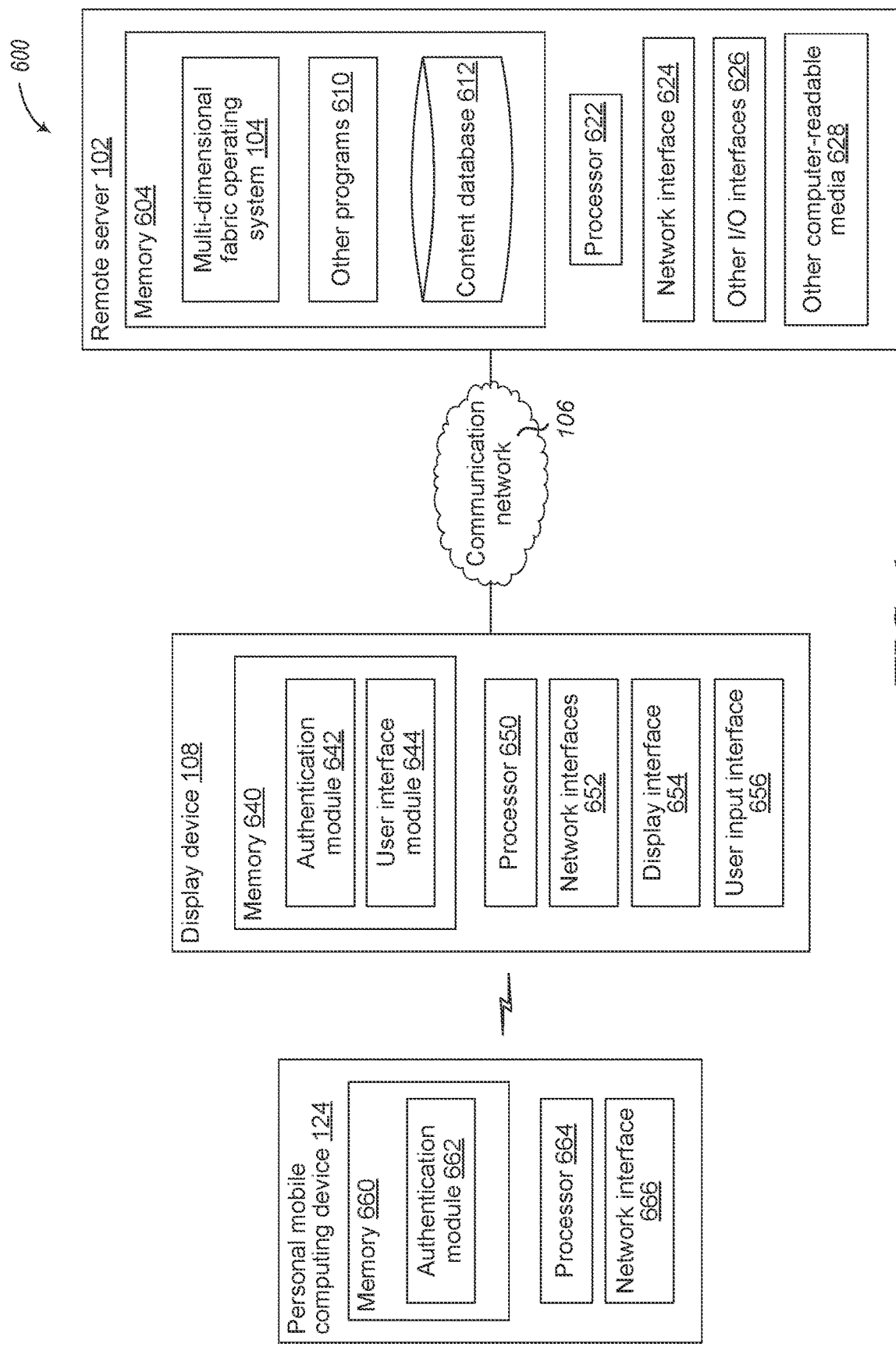
FIG. 6 shows a system diagram that describes one implementation of computing systems for implementing embodiments described herein.

FIG. 6 shows a system diagram that describes one implementation of computing systems for implementing embodiments described herein. System 600 includes remote server 102, one or more display devices 108, and one or more personal mobile computing devices 124.

As described herein, the remote server 102 is a computing device that can perform functionality described herein for implementing an operating system that provides a multi-dimensional fabric for storing content. One or more special purpose computing systems may be used to implement the remote server 102. Accordingly, various embodiments described herein may be implemented in software, hardware, firmware, or in some combination thereof. The remote server 102 includes memory 604, one or more processors 622, network interface 624, other input/output (I/O) interfaces 626, and other computer-readable media 628. In some embodiments, the remote server 102 may be implemented by cloud computing resources.

Processor 622 includes one or more processing devices that execute computer instructions to perform actions, including at least some embodiments described herein. In various embodiments, the processor 622 may include one or more central processing units ("CPU"), programmable logic, or other processing circuitry.

Memory 604 may include one or more various types of non-volatile and/or volatile storage technologies. Examples of memory 604 include, but are not limited to, flash memory, hard disk drives, optical drives, solid-state drives, various types of random-access memory ("RAM"), various types of read-only memory ("ROM"), other computer-readable storage media (also referred to as processor-readable storage media), or other memory technologies, or any combination thereof. Memory 604 may be utilized to store information, including computer-readable instructions that are utilized by processor 622 to perform actions, including at least some embodiments described herein.

Memory 604 may have stored thereon multi-dimensional fabric operating system 104. The multi-dimensional fabric operating system 104 authenticates users of personal mobile computing devices 124 via display devices 108 and provides a user interface of a multi-dimensional fabric for storing and accessing content, as described herein.

Memory 604 may include a content database 612 for storing content in accordance with the multi-dimensional fabric. Memory 604 may also store other programs 610. The other programs 510 may include other operating systems, user applications, or other computer programs that are accessible to the personal mobile computing device 124 via the display device 108.

Network interfaces 624 is configured to communicate with other computing devices, such as the display devices 108, via a communication network 106. Network interfaces 624 include transmitters and receivers (not illustrated) to send and receive data associated with the multi-dimensional fabric described herein.

Other I/O interfaces 626 may include interfaces for various other input or output devices, such as audio interfaces, other video interfaces, USB interfaces, physical buttons, keyboards, haptic interfaces, tactile interfaces, or the like. Other computer-readable media 628 may include other types of stationary or removable computer-readable media, such as removable flash drives, external hard drives, or the like.

The display devices 108 are computing devices that are remote from the remote server 102. In some embodiments, the display devices 108 may include one or more computing devices and display devices. The display devices 108 coordinate authentication between the personal mobile computing devices 124 and the remote server 102. The display devices 108 receive input from the users of the personal mobile computing device 124 and provide the input to the remote server 102. The display devices 108 receive the graphical user interfaces for the multi-dimensional fabric to be presented to the users of the personal mobile computing devices 124.

One or more special-purpose computing systems may be used to implement the display devices 108. Accordingly, various embodiments described herein may be implemented in software, hardware, firmware, or in some combination thereof.

The display devices 108 include memory 640, one or more processors 650, network interfaces 652, display interface 654, and user input interface 656. The memory 640, processor 650, and network interfaces 652 may be similar to, include similar components, or incorporate embodiments of memory 604, processor 622, and network interface 624 of remote server 102, respectively. Thus, processor 650 includes one or more processing devices that execute computer instructions to perform actions, including at least some embodiments described herein. In various embodiments, the processor 650 may include one or more CPUs, programmable logic, or other processing circuitry. The network interfaces 652 is also configured to communicate with the personal mobile computing devices 124, such as via Bluetooth or other short-range communication protocol or technology.

Memory 640 may include one or more various types of non-volatile and/or volatile storage technologies. Memory 640 may be utilized to store information, including computer-readable instructions that are utilized by processor 650 to perform actions, including at least some embodiments described herein. Memory 650 may store various modules or programs, including authentication module 642 and user interface 644. The authentication module 642 may perform actions that coordinate the authentication between the personal mobile computing devices 124 and the remote server 102. The user interface module 644 receives graphical user interface data from the remote server 102 for display or presentation, via the display interface 654, to the user of the personal mobile computing devices 108. The user interface module 644 also receives user input via the user input interface 656 and provides that input back to the remote server 102. In various embodiments, one or more capacitive, radar, infrared, LIDAR, or other type of gesture capturing sensors may be used to receive the user input. In some other embodiments, the user interface module 644 may receive user inputs via other input mechanisms, such as a mouse, stylus, voice-recognition, or other input sensors. Memory 640 may also store other programs.

The personal mobile computing devices 124 are computing devices that are remote from the display devices 108 and the remote server 102. When a personal mobile computing device 124 is within a threshold range of the display device 108 or when a user of the personal mobile computing device 124 activates authentication, the personal mobile computing device 124 provides authentication data or information to the display device 108 for forwarding to the remote server 102. In various embodiments, the personal mobile computing device 124 is separate from the display device 108, such that a user can walk up to a display device 108 with the personal mobile computing device 124 to initiate the process described herein to have the display device 108 present the user interface of the multi-dimensional fabric received from the remote server 102. The user can then provide input to the display device 108, such as with hand gestures or arm movement, to manipulate the multi-dimensional fabric and select content for display.

One or more special-purpose computing systems may be used to implement the personal mobile computing devices 124. Accordingly, various embodiments described herein may be implemented in software, hardware, firmware, or in some combination thereof.

The personal mobile computing devices 124 include memory 660, one or more processors 664, and a network interface 666. The memory 660, processor 664, and network interface 666 may be similar to, include similar components, or incorporate embodiments of memory 640, processor 650, and network interfaces 652 of display devices 108, respectively. Thus, processor 664 includes one or more processing devices that execute computer instructions to perform actions, including at least some embodiments described herein. In various embodiments, the processor 666 may include one or more CPUs, programmable logic, or other processing circuitry. The network interface 666 is configured to communicate with the display devices 108, but not with the remote server 102.

Memory 660 may include one or more various types of non-volatile and/or volatile storage technologies. Memory 660 may be utilized to store information, including computer-readable instructions that are utilized by processor 666 to perform actions, including at least some embodiments described herein. Memory 666 may store various modules or programs, including authentication module 662. The authentication module 662 may perform actions to communicate authentication information to a display device 108 when within a threshold distance from the display device or when activated by a user.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims but should be construed to include all possible embodiments along with the full scope of equivalents to which such claims are entitled. Accordingly, the claims are not limited by the disclosure.

The invention claimed is:

1. A system, comprising:
   a personal mobile computing device that stores authentication information;
   a display device that includes a first memory that stores first computer instructions and a first processor that when executing the first computer instructions cause the display device to:
   determine when the personal mobile computing device is within range of the display device;
   coordinate authentication between the personal mobile computing device and a remote server;
   receive a current location of the personal mobile computing device;
   display a multi-dimensional fabric user interface in a first arrangement to a user of the personal mobile computing device based on a valid authentication of the personal mobile computing device, wherein the multi-dimensional fabric user interface includes a time axis, a location axis, and a topic axis in a three-dimensional Euclidean space that is manipulatable and moveable by the user along multiple axes, including:
      display a plurality of content identifiers for a plurality of content arranged along the time axis, the location axis, and the topic axis with the location axis in the first arrangement being aligned based on the current location of the personal mobile computing device, wherein the plurality of content identifiers are displayed at unique intersections of the multiple axes within the three-dimensional Euclidean space;
   receive, via the multi-dimensional fabric user interface, input from the user, including:
      receive a multi-dimensional scroll from the user along all of the time axis, the location axis, and the topic axis to move the three-dimensional Euclidean space from the first arrangement to a second arrangement; and
      provide the input to the remote server; and
   the remote server includes a second memory that stores second computer instructions and a second processor that when executing the second computer instructions cause the remote server to:
      select the multi-dimensional fabric user interface specific for the user based on the valid authentication of the personal mobile computing device;
      provide the multi-dimensional fabric user interface to the display device;
      receive the input from the display device;
      manipulate the multi-dimensional fabric user interface based on the input by using the multi-dimensional scroll received from the user to move the three-dimensional Euclidean space from the first arrangement to the second arrangement; and
      provide the manipulated multi-dimensional fabric user interface to the display device to be displayed to the user.

2. The system of claim 1, wherein the second processor manipulates the multi-dimensional fabric user interface when further execution of the second computer instructions cause the remote server to:
   receive a time input from the display device;
   receive a location input from the display device; and
   select content to present to the user in the multi-dimensional fabric user interface based on the time input and the location input.

3. The system of claim 1, wherein the first processor receives the multi-dimensional scroll when further execution of the first computer instructions cause the remote server to:
   receive a current location of the personal mobile computing device;
   receive a current time of the personal mobile computing device; and
   generate the multi-dimensional scroll with the current location and the current time to move the multi-dimensional fabric user interface to content associated with the current location and the current time of the personal mobile computing device.

4. The system of claim 1, wherein the first processor displays the plurality of content identifiers when further execution of the first computer instructions cause the remote server to:
   display content identifiers along the location axis based on content locations relative to a target location.

5. The system of claim 1, wherein the first processor displays the plurality of content identifiers when further execution of the first computer instructions cause the remote server to:
   display content identifiers along the time axis based on content locations relative to a target time.

6. The system of claim 1, wherein the first processor displays the plurality of content identifiers when further execution of the first computer instructions cause the remote server to:
   display content identifiers along the topic axis based on topic frequency of access.

7. A method, comprising:
   determining when a personal mobile computing device is within range of a display device;

coordinating, by the display device, authentication between the personal mobile computing device and a remote server;

selecting a multi-dimensional fabric user interface specific for a user of the personal mobile computing device based on the valid authentication of the personal mobile computing device, wherein the multi-dimensional fabric user interface includes a time axis, a location axis, and a topic axis in a three-dimensional Euclidean space that is manipulatable and movable by the user along multiple axes;

receiving a current location of the personal mobile computing device;

displaying, on the display device, a first arrangement of the multi-dimensional fabric user interface to the user with the location axis aligned based on the current location of the personal mobile computing device, wherein a plurality of content is presented in the multi-dimensional fabric user interface along the time axis, the location axis, and the topic axis at unique intersections of the multiple axes within the three-dimensional Euclidean space;

receiving, via the display device, input from the user, including:

receiving a multi-dimensional scroll from the user along all of the time axis, the location axis, and the topic axis to move the three-dimensional Euclidean space from the first arrangement to a second arrangement;

manipulating the multi-dimensional fabric user interface based on the input by using the multi-dimensional scroll received from the user to move the three-dimensional Euclidean space from the first arrangement to the second arrangement; and displaying, on the display device, the manipulated multi-dimensional fabric user interface to the user.

8. The method of claim 7, further comprising:

storing, by the remote server, the plurality of content in the three-dimensional Euclidean space along the time axis, the location axis, and the topic axis based on a content time, a content location, and a content topic.

9. The method of claim 7, wherein displaying the multi-dimensional fabric user interface to the user includes:

displaying, by the display device, a plurality of content identifiers for the plurality of content arranged in the three-dimensional Euclidean space.

10. The method of claim 7, displaying the multi-dimensional fabric user interface to the user includes:

displaying, by the display device, the plurality of content arranged based on time, location, and topic in the multi-dimensional fabric user interface.

11. The method of claim 7, wherein manipulating the multi-dimensional fabric user interface includes:

receiving, via the display device, a time input from the user;

receiving, via the display device, a location input from the user; and selecting, by the remote server, content to present to the user in the multi-dimensional fabric user interface based on the time input and the location input.

12. The method of claim 7, comprising:

determining when a second personal mobile computing device is within range of the display device;

coordinating, by the display device, authentication between the second personal mobile computing device and the remote server;

selecting a second multi-dimensional fabric user interface specific for a second user of the second personal mobile computing device based on the valid authentication of the second personal mobile computing device, wherein the second multi-dimensional fabric is separate from the multi-dimensional fabric user interface specific for the user of the personal mobile computing device; and displaying, on the display device, the second multi-dimensional fabric user interface to the second user, wherein other content is presented in the second multi-dimensional fabric user interface along the time axis, the location axis, and the topic axis.

13. A computing device, comprising:

a memory that stores content in a multi-dimensional fabric and computer instructions;

a processor that executes the computer instructions to perform actions, including:

receiving, from a display device, an authentication request for a personal mobile computing device;

authenticating the personal mobile computing device with the display device;

selecting a multi-dimensional fabric user interface specific for a user based on a valid authentication of the personal mobile computing device;

receiving a current location of the personal mobile computing device;

providing the multi-dimensional fabric user interface in a first arrangement to the display device for presentation to a user of the personal mobile computing device, wherein the multi-dimensional fabric user interface presents a plurality of content identifiers arranged along a time axis, a location axis, and a topic axis in a three-dimensional Euclidean space with the location axis aligned based on the current location of the personal mobile computing device, and wherein the multi-dimensional fabric user interface is manipulatable and moveable by the user along multiple axes;

receiving, via the multi-dimensional fabric user interface, input from the display device, including:

receiving a multi-dimensional scroll along all of the time axis, the location axis, and the topic axis to move the three-dimensional Euclidean space from the first arrangement to a second arrangement;

manipulating the multi-dimensional fabric user interface based on the input by using the multi-dimensional scroll to move the three-dimensional Euclidean space from the first arrangement to the second arrangement; and providing the manipulated multi-dimensional fabric user interface to the display device for presentation to the user.

14. The computing device of claim 13, wherein the processor executes the computer instructions to perform further actions, including:

receiving a time input from the display device;

receiving a location input from the display device; and selecting content to present to the user in the multi-dimensional fabric user interface based on the time input and the location input.

* * * * *